United States Patent
Freiberg et al.

(10) Patent No.: US 9,977,506 B2
(45) Date of Patent: May 22, 2018

(54) INPUT OPTIMIZATION BASED ON FREQUENCY OF USE

(71) Applicant: Microsoft Technology Licensing, LLC, Redmond, WA (US)

(72) Inventors: Oren Freiberg, Seattle, WA (US); Brandon Walderman, Redmond, WA (US); Scott Sheehan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 396 days.

(21) Appl. No.: 14/720,650

(22) Filed: May 22, 2015

(65) Prior Publication Data

US 2016/0342216 A1 Nov. 24, 2016

(51) Int. Cl.
*G06F 3/01* (2006.01)
*G06F 3/02* (2006.01)
(Continued)

(52) U.S. Cl.
CPC .............. *G06F 3/017* (2013.01); *G06F 3/013* (2013.01); *G06F 3/02* (2013.01); *G06F 3/0346* (2013.01); *G06F 3/03543* (2013.01); *G06F 3/03545* (2013.01); *G06F 3/03547* (2013.01); *G06F 3/04883* (2013.01); *G06F 3/167* (2013.01); *G06F 9/4446* (2013.01)

(58) Field of Classification Search
CPC .............. G06F 9/4446; G06F 3/03545; G06F 3/03543; G06F 3/02; G06F 3/017
See application file for complete search history.

(56) References Cited

U.S. PATENT DOCUMENTS

| 8,816,971 B2 | 8/2014 | Kolmykov-Zotov et al. |
| 2005/0044508 A1 | 2/2005 | Stockton |

(Continued)

FOREIGN PATENT DOCUMENTS

EP 2068241 A2 6/2009

OTHER PUBLICATIONS

"International Search Report and Written Opinion Issued in PCT Application No. PCT/US2016/029277", dated Jul. 28, 2016, 11 Pages.

(Continued)

*Primary Examiner* — Abbas Abdulselam
(74) *Attorney, Agent, or Firm* — Lyon & Harr, LLP; Richard T. Lyon

(57) ABSTRACT

A primary user input mechanism is recommended to an application that executes on a computing device which supports a plurality of different user input mechanisms that users of the computing device can utilize to input information into the computing device. The utilization of each of the user input mechanisms is monitored on an ongoing basis, where this monitoring includes weighting each of the user input mechanisms based on its frequency of use. Upon receiving an indication to launch the application on the computing device, a one of the user input mechanisms currently having the highest weight is recommended to the application as being the primary user input mechanism. The weighting of each of the user input mechanisms is also provided to the application.

20 Claims, 4 Drawing Sheets

(51) Int. Cl.
  *G06F 3/0354* (2013.01)
  *G06F 3/0488* (2013.01)
  *G06F 3/16* (2006.01)
  *G06F 3/0346* (2013.01)
  *G06F 9/44* (2018.01)

(56) References Cited

U.S. PATENT DOCUMENTS

| | | |
|---|---|---|
| 2010/0251128 A1 | 9/2010 | Cordasco |
| 2011/0060997 A1 | 3/2011 | Scoda |
| 2012/0274662 A1 | 11/2012 | Kim et al. |
| 2013/0088429 A1* | 4/2013 | Yang ............... G06F 1/3231 345/158 |
| 2013/0174012 A1 | 7/2013 | Kwan et al. |
| 2013/0326333 A1 | 12/2013 | Hashmi |
| 2014/0108945 A1 | 4/2014 | Coman et al. |
| 2014/0354554 A1 | 12/2014 | Devi et al. |
| 2014/0365966 A1 | 12/2014 | Deng et al. |
| 2015/0039622 A1 | 2/2015 | Sampath-Kumar et al. |
| 2015/0378440 A1* | 12/2015 | Umlauf ............... G06F 3/017 345/156 |

OTHER PUBLICATIONS

Apple, Inc., "Safari Web Content Guide", Mar. 10, 2014, pp. 11, Apple Inc., retrieved at <<https://developer.apple.com/library/ios/documentation/AppleApplications/Reference/SafariWebContent/CreatingContentforSafarioniPhone/CreatingContentforSafarioniPhone.html>>.

Nielsen, "Mouse vs. Fingers as Input Device", Apr. 10, 2012, pp. 2, Nielsen Norman Group, retrieved at <<http://www.nngroup.com/articles/mouse-vs-fingers-input-device/>>.

Treasury Board of Canada Secretariat, "Optimizing websites and Web applications for mobile devices (Technical specifications for the Web and mobile presence)", Apr. 30, 2013, pp. 71, Government of Canada, retrieved at <<http://www.tbs-sct.gc.ca/ws-nw/mo-om/ts-st/p4-eng.asp>>.

World Wide Web Consortium (W3C), "Media Queries Level 4", Mar. 25, 2015, pp. 54, W3C, retrieved at <<http://dev.w3.org/csswg/mediaqueries-4/>>.

Yin, et al., "Optimization of web page for mobile devices", Proceedings of the 13th international conference on World Wide Web, May 2004, pp. 9, Association for Computing Machinery (ACM), retrieved at <<https://www.iscs.nus.edu.sg/~leews/publications/www04.pdf>>.

\* cited by examiner

INPUT OPTIMIZATION BASED ON FREQUENCY OF USE

BACKGROUND

Given the broad and ever-growing range of computing and data networking technologies that are available, modern day users commonly utilize a plurality of different types of computing devices to execute a plurality of different types of applications each of which performs one or more prescribed tasks and/or functions. Each of these different types of computing devices often supports a plurality of different user input mechanisms (e.g., different modes of user input). In other words, each of the computing devices that is utilized by a given user may be able to receive input from the user via a plurality of different user input mechanisms, where the user may be free to choose from any of these mechanisms and dynamically change the particular mechanism they are currently utilizing at will.

SUMMARY

Input recommendation technique implementations described herein generally involve recommending a primary user input mechanism to an application that executes on a computing device which supports a plurality of different user input mechanisms that users of the computing device can utilize to input information into the computing device. In one exemplary implementation the utilization of each of the user input mechanisms is monitored on an ongoing basis, where this monitoring includes weighting each of the user input mechanisms based on its frequency of use. Upon receiving an indication to launch the application on the computing device, a one of the user input mechanisms currently having the highest weight is recommended to the application as being the primary user input mechanism. In another exemplary implementation the weighting of each of the user input mechanisms is provided to the application.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the input recommendation technique implementations described herein will become better understood with regard to the following description, appended claims, and accompanying drawings where:

DETAILED DESCRIPTION

Figure 1:
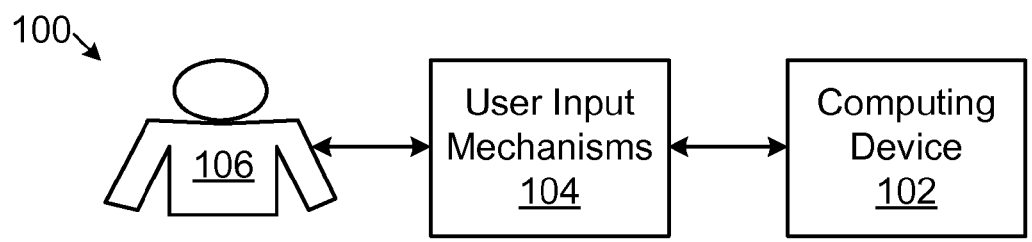
FIG. 1 is a diagram illustrating an exemplary implementation, in simplified form, of a system framework for realizing the input recommendation technique implementations described herein.

In the following description of input recommendation technique implementations reference is made to the accompanying drawings which form a part hereof, and in which are shown, by way of illustration, specific implementations in which the input recommendation technique can be practiced. It is understood that other implementations can be utilized and structural changes can be made without departing from the scope of the input recommendation technique implementations.

It is also noted that for the sake of clarity specific terminology will be resorted to in describing the input recommendation technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the input recommendation technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the input recommendation technique does not inherently indicate any particular order nor imply any limitations of the input recommendation technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 User Input Mechanisms

As was briefly described heretofore, modern day users commonly utilize a plurality of different types of computing devices to execute a plurality of different types of applications each of which performs one or more prescribed tasks and/or functions. Examples of such computing devices include, but are not limited to, a conventional smartphone, a conventional tablet computer, a conventional laptop computer (also known as a notebook computer), a conventional desktop computer, a conventional video game console (e.g., the WII™ (a trademark of Nintendo), the PLAYSTATION® (a registered trademark of Sony Computer Entertainment Inc.), and the XBOX® (a registered trademark of Microsoft Corporation), among other types of video game consoles), a conventional wearable computer (e.g., a smartwatch, and smartglasses, among other types of wearable computers), and a conventional surface computer (also known as a tabletop computer). As is appreciated in the art of computing devices, each of these exemplary types of computing devices supports a plurality of different user input mechanisms examples of which are described in more detail hereafter, where a given user is generally free to choose from any of these user input mechanisms and dynamically change the particular user input mechanism they are currently utilizing at will. As will be appreciated from the more detailed description that follows, the input recommendation technique implementations described herein are operational with any type of computing device that takes input from a user and supports two or more different user input mechanisms. In addition to the aforementioned exemplary types of computing devices, the input recommendation technique implementations are also operational with any type of user input console that is employed in a conventional smart home (also known as a connected home) application for the control of various home systems such as audio, video, lighting, HVAC (heating, ventilation and air conditioning), appliances, security locks of gates and doors, and the like. The input recommendation technique implementations are also operational with any type of user input console that is employed in a conventional motor vehicle (e.g., a car, truck, and the like) for the control of various motor vehicle systems such as audio, HVAC, and the like.

The term "screen-contacting gesture" is used herein to refer to either a physical tap, or stroke, or compound stroke that is made by a user directly on a touch-sensitive display screen of a computing device. It will be appreciated that the user can make a given screen-contacting gesture using various modalities such as a stylus or pen (hereafter simply referred to as a stylus for simplicity) which is held by the user, or a finger of the user, or the like. The term "non-screen-contacting gesture" is used herein to refer to any type of gesture that is made by a user of a computing device which does not contact a display screen of the computing device. It will also be appreciated that the user can make a given non-screen-contacting gesture using various modalities. By way of example but not limitation, in one implementation of the input recommendation technique described herein the user can make a given non-screen-contacting gesture using their gaze (e.g., the user can gaze at a given element that is displayed on the display screen of the computing device, or a given region thereof); such a gesture is hereafter simply referred to as a gaze-based gesture. In another implementation of the input recommendation technique the user can make a given non-screen-contacting gesture using one or both of their hands to make a prescribed in-air gesture which can be either substantially static or substantially moving; such a gesture is hereafter simply referred to as a hand-based in-air gesture. In yet another implementation of the input recommendation technique the user can make either a given in-air selection or a given non-screen-contacting gesture using a handheld remote controller such as the WII REMOTE™ (a trademark of Nintendo), or the PLAYSTATION®MOVE (a registered trademark of Sony Computer Entertainment Inc.), among other types of handheld remote controllers.

The term "touch-enabled computing device" is used herein to refer to a computing device that includes a touch-sensitive display screen which can detect the presence, location, and path of movement if applicable, of screen-contacting gestures that a user makes on the display screen, and then interpret the gestures. The touch-sensitive display screen can be either integrated into the computing device, or externally connected thereto in either a wired or wireless manner. The term "voice-enabled computing device" is used herein to refer to a computing device that includes an audio input device such as one or more microphones, or the like, which can capture speech that a user utters and then interpret (e.g., recognize) the speech. The audio input device can be either integrated into the computing device, or externally connected thereto in either a wired or wireless manner. The term "vision-enabled computing device" is used herein to refer to a computing device that includes a user-facing video input device such as one or more video cameras, or the like, which can detect the presence of non-screen-contacting gestures that a user makes, and then interpret the gestures. The user-facing video input device can be either integrated into the computing device, or externally connected thereto in either a wired or wireless manner. The term "motion-enabled computing device" is used herein to refer to a computing device that includes a motion sensing device such as an accelerometer, or the like, which can detect the magnitude and direction of movements of the computing device that are made by a user, and then interpret the movements (e.g., the user may tilt the computing device in order to move a cursor on the computing device's display screen, and the user may perform a drop-like gesture with the computing device in order to select a given element that is displayed on the computing device's display screen).

The input recommendation technique implementations described herein are operational with a wide variety of user input mechanisms that may be supported by a given computing device. By way of example but not limitation, the user input mechanisms can include a physical keyboard that is either integrated into the computing device or externally connected thereto in either a wired or wireless manner. The user input mechanisms can also include a mouse that is externally connected to the computing device in either a wired or wireless manner. The user input mechanisms can also include a trackpad (also known as a touchpad) that is either integrated into the computing device or externally connected thereto in either a wired or wireless manner. The user input mechanisms can also include a handheld remote controller that is externally connected to the computing device in a wireless manner. In the case where the computing device is touch-enabled, the user input mechanisms can also include finger-based screen-contacting gestures and stylus-based screen-contacting gestures that are made by a user. In the case where the computing device is voice-enabled, the user input mechanisms can also include speech that a user utters. In the case where the computing device is vision-enabled, the user input mechanisms can also include gaze-based gestures and hand-based in-air gestures that are made by a user. In the case where the computing device is motion-enabled, the user input mechanisms can also include movements of the computing device that are made by a user.

As is appreciated in the art of computer user interfaces (UIs), each of the just-described different user input mechanisms has its own set of strengths and weaknesses. For example, because of various factors a mouse, a trackpad, a physical keyboard, and stylus-based screen-contacting gestures are generally more precise user input mechanisms than finger-based screen-contacting gestures, hand-based in-air gestures, gaze-based gestures, speech, and a handheld remote controller. More particularly and by way of example, user input from a mouse, a trackpad, and stylus-based screen-contacting gestures generally provide high precision x-y coordinate data to the application. User input from a mouse, a trackpad, and a physical keyboard also generally manipulates a cursor on the computing device's display screen to assist with targeting. User input from a physical keyboard is also explicit. User input from stylus-based screen-contacting gestures generally does not manipulate a cursor to assist with targeting. User input from finger-based screen-contacting gestures generally provides lower precision x-y coordinate data to the application (due to the larger contact area associated with a user's fingertip) and does not manipulate a cursor to assist with targeting. The precision of user input from speech is generally dependent on various factors such as the particular speech interpretation/recognition method that is employed by the computing device, the quality and configuration of the particular audio input device that is employed thereby, and the level and nature of any background noise that may be present in the user's current environment. User input from speech generally does not manipulate a cursor to assist with targeting. The precision of user input from gaze-based gestures is generally dependent on various factors such as the particular gaze interpretation/recognition method that is employed by the computing device, the quality and configuration of the particular video input device that is employed thereby, and the lighting conditions in the user's current environment. User input from gaze-based gestures generally does not manipulate a cursor to assist with targeting. The precision of user input from hand-based in-air gestures is generally dependent on various factors such as the particular in-air gesture interpretation/recognition method that is employed by the computing device, the quality and configuration of the particular video input device that is employed thereby, and the lighting conditions in the user's current environment. User input from hand-based in-air gestures generally manipulates a cursor to assist with targeting, as does user input from a handheld remote controller.

As is also appreciated in the art of computer UIs, the term "natural user interface" (NUI) refers to a class of user input mechanisms that allow a user to operate and interact with a computing device through actions which are intuitive to the user and correspond to their natural, everyday behavior. As such, user input mechanisms that can be classified as a NUI are advantageous. User input mechanisms such as stylus-based and finger-based screen-contacting gestures, gaze-based gestures, hand-based in-air gestures, speech, and a handheld remote controller can be classified as a NUI. Additionally, certain user input mechanisms may support specific features that are not supported by other user input mechanisms. For example, user input mechanisms such as a mouse, a trackpad, a handheld remote controller, and hand-based in-air gestures may support a hovering feature that allows the user to hover the cursor over a given element that is displayed on the computing device's display screen for a prescribed period of time, after which a pop-up may be displayed on the screen which may include various types of information associated with the element such as a menu of items related to the element that the user may select from, or additional information about the element, among other things. The finger-based screen-contacting gestures user input mechanism may also support a hovering feature that allows the user to hover their finger over a given element that is displayed on the computing device's touch-sensitive display screen for a prescribed period of time, after which the just-describe pop-up is displayed on the screen.

As is appreciated in the art of applications that execute on computing devices and take input from users, a given application may provide a graphical user interface (GUI) and related user-interaction model that generally includes a plurality of user-selectable functionality control elements which assist users in locating and utilizing the functionality of the application. The application may customize its GUI and user-interaction model in a particular manner depending on the characteristics of the particular user input mechanism a given user is currently utilizing. By way of simplified example, if the user input mechanism that the user is currently utilizing is either a mouse, or a trackpad, or stylus-based screen-contacting gestures, the GUI and user-interaction model may include a larger number of functionality control elements with a smaller spacing there-between, where each of these elements has a smaller selection target, and the behavior of the user-interaction model may be optimized for either mouse, or trackpad, or stylus-based screen-contacting gestures. Additionally, in the case where the user is currently using stylus-based screen-contacting gestures and the user selects an "input" control element button on the GUI, the application may display a sector within which the user may write with the stylus. The term "sector" is used herein to refer to a segmented region of the computing device's display screen in which a particular type of GUI and/or information is displayed, or a particular type of function is performed. If the user input mechanism that the user is currently utilizing is either finger-based screen-contacting gestures or gaze-based gestures, the GUI and user-interaction model may include a smaller number of functionality control elements with a larger spacing there-between, where each of these elements has a larger selection target, and the behavior of the user-interaction model may be optimized for either finger-based screen-contacting gestures or gaze-based gestures.

2.0 Input Recommendation Based on Frequency of Use

Generally speaking, the input recommendation technique implementations described herein recommend a primary user input mechanism to a given application that executes on a given computing device which supports a plurality of different user input mechanisms that users of the computing device can utilize to input information into the computing device. The input recommendation technique implementations can also provide user input mechanism utilization metrics to the application. The term "primary user input mechanism" is used herein to refer to a given one of the different user input mechanisms that has the highest probability of being utilized by the users to input information into the computing device. In other words, a primary user input mechanism is the one of the different user input mechanisms that the users are most likely to utilize to input information into the computing device given their previous utilization of the different user input mechanisms that are supported by the computing device. Correspondingly, the term "secondary user input mechanism" is used herein to refer to another one of the different user input mechanisms that has the second highest probability of being utilized by the users to input information into the computing device.

The input recommendation technique implementations described herein are advantageous for various reasons including, but not limited to, the following. The input recommendation technique implementations allow the application to optimize the users' experience by dynamically customizing (e.g., adapting/tailoring) the application's UI and user interaction model to the particular characteristics of the user input mechanism that the users are most likely to utilize to interact with the application. In other words and as will be described in more detail hereafter, rather than the application having to guess/assume which one of the different user input mechanisms is going to be the primary user input mechanism, where this guess/assumption may be incorrect, the input recommendation technique implementations monitor (e.g., track) the utilization of each of the user input mechanisms on an ongoing basis and recommend to the application which one of the user input mechanisms will be the primary user input mechanism. In an exemplary implementation of the input recommendation technique this recommendation is based on metrics that reflect the users' actual user input mechanism utilization patterns.

Accordingly and by way of example but not limitation, the input recommendation technique implementations described herein provide a user who primarily utilizes finger-based screen-contacting gestures to input information into a touch-enabled computing device with an optimized experience that is tailored to this particular form of input for the various applications that the user may execute on this computing device. The input recommendation technique implementations provide another user who primarily utilizes stylus-based screen-contacting gestures to input information into a touch-enabled computing device with an optimized experience that is tailored to this particular form of input for the various applications that the user may execute on this computing device. The input recommendation technique implementations described herein provide yet another user who primarily utilizes hand-based in-air gestures to input information into a vision-enabled computing device with an optimized experience that is tailored to this particular form of input for the various applications that the user may execute on this computing device.

FIG. 1 illustrates an exemplary implementation, in simplified form, of a system framework for realizing the input recommendation technique implementations described herein. As exemplified in FIG. 1 the system framework 100 includes a computing device 102 and a plurality of different user input mechanisms 104 one or more of which are utilized by users 106 of the computing device to input information into the computing device. As described heretofore, input recommendation technique implementations are operational with a wide variety of user input mechanisms including, but not limited to, the various exemplary user input mechanisms described in the foregoing section.

Figure 2:
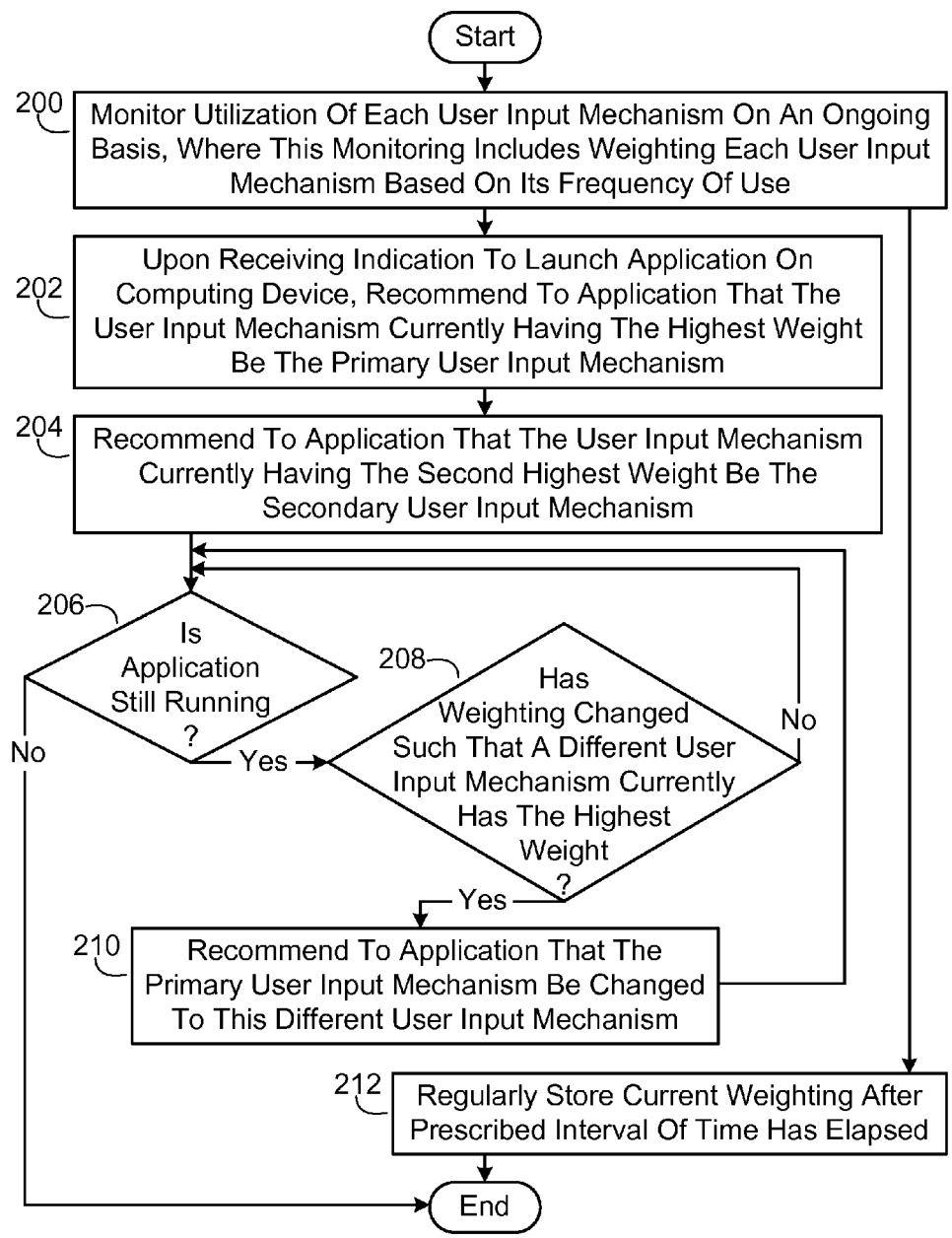
FIG. 2 is a flow diagram illustrating an exemplary implementation, in simplified form, of a process for recommending a primary user input mechanism to an application that executes on a computing device which supports a plurality of different user input mechanisms one or more of which are utilized by users of the computing device to input information into the computing device.

FIG. 2 illustrates an exemplary implementation, in simplified form, of a process for recommending a primary user input mechanism to an application that executes on a computing device which supports a plurality of different user input mechanisms one or more of which are utilized by users of the computing device to input information into the computing device. As exemplified in FIG. 2 the process starts with monitoring the utilization of each of the user input mechanisms on an ongoing basis, where this monitoring includes weighting (e.g., rank ordering) each of the user input mechanisms based on its frequency of use (process action 200). Then, upon receiving an indication to launch the application on the computing device, a one of the user input mechanisms currently having the highest weight (e.g., the user input mechanism that is currently ranked the highest) is recommended to the application as being the primary user input mechanism (process action 202); it is noted that this action 202 produces the technical effect of increasing user interaction performance by allowing the application to dynamically customize its UI and user interaction model to the particular characteristics of the user input mechanism that the users are most likely to utilize to interact with the application. Another one of the user input mechanisms currently having the second highest weight can also be recommended to the application as being a secondary user input mechanism (process action 204). Whenever the application is still running (process action 206, Yes) and the user input mechanisms weighting changes such that a different one of the user input mechanisms currently has the highest weight (process action 208, Yes), it can be recommended to the application that the primary user input mechanism be changed to this different one of the user input mechanisms (process action 210).

Upon receiving a given primary user input mechanism recommendation, the application can customize its UI and user interaction model to the particular characteristics of this input mechanism, where the specific details of this customization are left up to the developer of the application.

It will be appreciated that the just-described action of monitoring the utilization of each of the user input mechanisms on an ongoing basis can be implemented in various ways. By way of example but not limitation, in one implementation of the input recommendation technique described herein this monitoring is performed separately for each of the users of the computing device so that the user input mechanisms weighting is user-specific. In another implementation of the input recommendation technique this monitoring is aggregated across the various users of the computing device so that the user input mechanisms weighting is user-independent. In yet another implementation of the input recommendation technique this monitoring is performed on a per-application basis (e.g., separately for each of the applications that execute on the computing device) so that the user input mechanisms weighting is application-specific. In yet another implementation of the input recommendation technique this monitoring is aggregated across each different application that executes on the computing device so that the user input mechanisms weighting is application-independent.

It will also be appreciated that the just-described action of weighting each of the user input mechanisms based on its frequency of use can also be implemented in various ways. As is appreciated in the art of computing devices, as a given user utilizes each of the user input mechanisms the computing device's operating system receives messages representing events (e.g., user actions) that occur due to this utilization, and these messages can be interpreted by the operating system. In one implementation of the input recommendation technique described herein every one of the messages received from each of the user input mechanisms is counted on an ongoing basis, and each of the user input mechanisms is weighted according to this message count. In one version of this particular implementation the current total count of messages received from a given user input mechanism is assigned to be the current weight thereof, so that the user input mechanism currently having the highest weight is the user input mechanism having the highest current total count of messages received therefrom. Similarly, the user input mechanism currently having the second highest weight is the user input mechanism having the second highest current total count of messages received therefrom. In another version of this particular implementation the current total count of messages received from a given user input mechanism is normalized in a prescribed manner, and this normalized count it assigned to be the current weight of the user input mechanism, so that the user input mechanism currently having the highest weight is the user input mechanism having the highest normalized current total count of messages received therefrom. Similarly, the user input mechanism currently having the second highest weight is the user input mechanism having the second highest normalized current total count of messages received therefrom.

In another implementation of the input recommendation technique described herein the messages received from each of the user input mechanisms are processed before they are counted where this processing can be performed in various ways such as the following. In one version of this particular implementation the processing is performed by counting just prescribed sequences of messages received from each of the user input mechanisms. In the case where the user input mechanisms include a mouse, one example of such a sequence of messages that would be counted is a message representing a mouse down event that occurs over a given element that is displayed on the display screen immediately followed by another message representing a mouse up event that also occurs over this same element. In the case where the computing device is touch-enabled and the user input mechanisms include finger-based screen-contacting gestures, another example of such a sequence of messages that would be counted is a message indicating that a user placed their finger onto the display screen, immediately followed by another message indicating that the user dragged their finger on the screen, immediately followed by yet another message that the user lifted their finger off of the screen. In another version of this particular implementation the processing is performed as follows. After a given message received from a given user input mechanism has been counted, a prescribed period of time has to elapse before a subsequent message received from the input mechanism will be counted, where this period of time may be different for different ones of the user input mechanisms.

The input recommendation technique implementations described herein are generally operational with any type of application that executes on the computing device and takes input from users. Examples of such an application include a conventional web browser application, a conventional email application, a conventional word processing application, a conventional media creation application, or the like. The term "web" is used herein to refer to the World Wide Web. In the case where the application to which the primary user input mechanism recommendation is made is a web browser, one implementation of the input recommendation technique described herein is possible where the action of monitoring the utilization of each of the user input mechanisms on an ongoing basis is performed separately for each different website (e.g., each different web domain such as microsoft.com, or the like) that is accessed by the web browser so that the user input mechanisms weighting is website-specific. In other words, this weighting is performed on a per-website/domain basis so that it is domain-specific.

As is appreciated in the art of web browsing applications, many of today's web browsing applications support a feature known as tabbed browsing that enables a user to open a plurality of tabbed frames within a single web browser instantiation. The user can then independently manage a different web browsing session in each of the tabbed frames and quickly switch from one session to another by selecting a desired tab. In the case where the application to which the primary user input mechanism recommendation is made is a web browser that includes a plurality of tabbed frames that can be utilized by the users of the computing device to browse the web, another implementation of the input recommendation technique described herein is possible where the action of monitoring the utilization of each of the user input mechanisms on an ongoing basis is performed separately for each different tabbed frame so that the user input mechanisms weighting is frame-specific.

Referring again to FIG. 2, the current user input mechanisms weighting can be regularly stored after a prescribed interval of time (e.g., 60 seconds, among other intervals of time) has elapsed (process action 212). It is noted that the current user input mechanisms weighting can be stored in various ways. For example, this weighting can be stored in a database that the computing device's operating system uses to record information about the configuration of the computing device.

Figure 3:
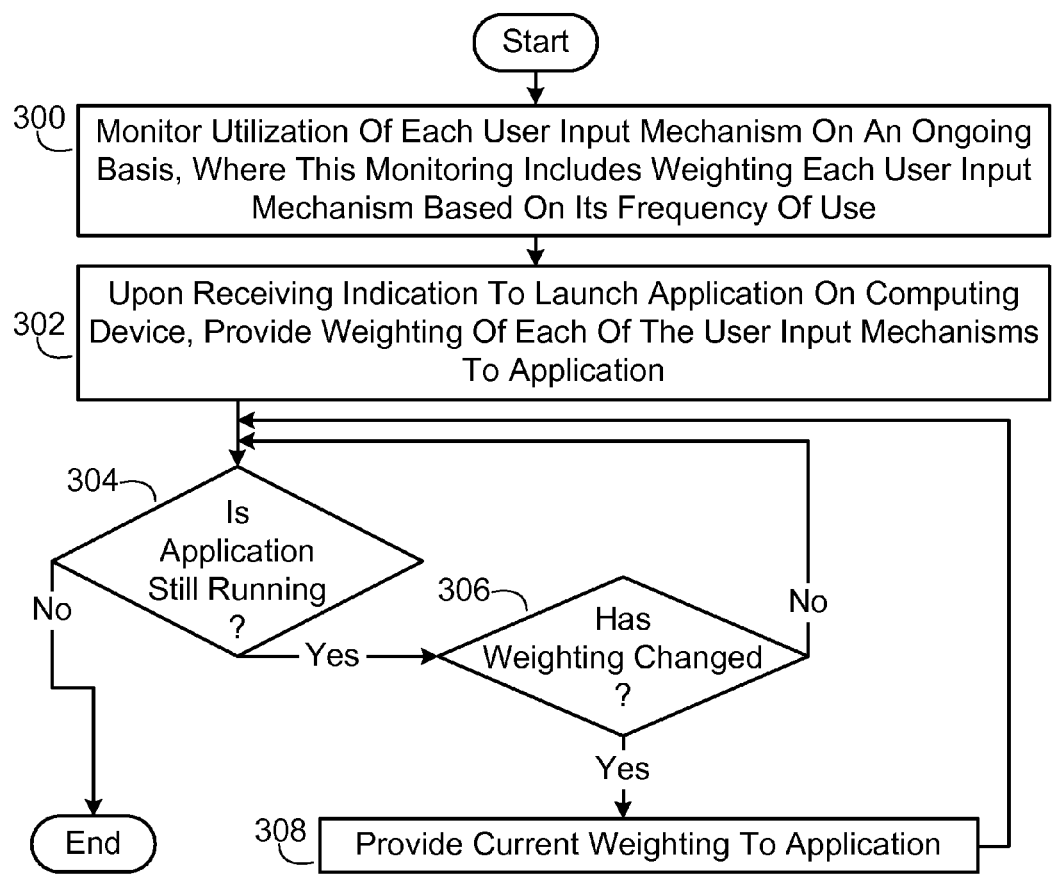
FIG. 3 is a flow diagram illustrating an exemplary implementation, in simplified form, of a process for providing user input mechanism utilization metrics to an application that executes on a computing device which supports a plurality of different user input mechanisms one or more of which are utilized by users of the computing device to input information into the computing device.

FIG. 3 illustrates an exemplary implementation, in simplified form, of a process for providing user input mechanism utilization metrics to an application that executes on a computing device which supports a plurality of different user input mechanisms one or more of which are utilized by users of the computing device to input information into the computing device. As exemplified in FIG. 3 the process starts with monitoring the utilization of each of the user input mechanisms on an ongoing basis, where this monitoring includes weighting each of the user input mechanisms based on its frequency of use (process action 300). Then, upon receiving an indication to launch the application on the computing device, the user input mechanisms weighting is provided to the application (process action 302); it is noted that this action 302 produces the technical effect of increasing user interaction performance by allowing the application to dynamically customize its UI and user interaction model to the particular characteristics of the user input mechanism that the users are most likely to utilize to interact with the application. Whenever the application is still running (process action 304, Yes) and the user input mechanisms weighting changes (process action 306, Yes), the current user input mechanisms weighting can be provided to the application (process action 308). Upon receiving the user input mechanisms weighting, the application can analyze it in order to determine how the application's UI and user interaction model are to be customized.

3.0 Other Implementations

While the input recommendation technique has been described by specific reference to implementations thereof, it is understood that variations and modifications thereof can be made without departing from the true spirit and scope of the input recommendation technique. For example, the input recommendation technique implementations described heretofore have determined the primary user input mechanism without considering the environment that the computing device is being used in (hereafter simply referred to as the environment of the computing device). In other words, in the input recommendation technique implementations described heretofore the primary user input mechanism recommendation is environment-independent. An alternate implementation of the input recommendation technique is possible where the primary user input mechanism recommendation is environment-specific. More particularly, in this alternate implementation the aforementioned action of recommending to the application that a one of the user input mechanisms currently having the highest weight be the primary user input mechanism may be realized by first determining the current environment of the computing device, and then recommending to the application that a one of the user input mechanisms currently having the highest weight for this current environment be the primary user input mechanism. This alternate implementation thus introduces an environmental context to the primary user input mechanism recommendation so that the primary user input mechanism recommendation may be different for each of a plurality of pre-defined environments that the computing device may be used in (e.g., a car, or an office setting, or a home setting, among other types of environments). Accordingly and by way of example but not limitation, in the case where the computing device is a smartphone that is both voice-enabled and touch-enabled, whenever the computing device is being used in a car the primary user input mechanism recommendation may be voice (e.g., speech that users of the computing device utter), and whenever the computing device is being used in an office setting the primary user input mechanism recommendation may be touch (e.g., finger-based and/or stylus-based screen-contacting gestures that are made by users of the computing device). It will be appreciated that the current environment of the computing device can be determined using various conventional methods. For example, in the case where the computing device includes one or more video cameras, the current environment of the computing device can be determined by analyzing the video that is captured by these cameras.

It is also noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Exemplary Operating Environments

Figure 4:
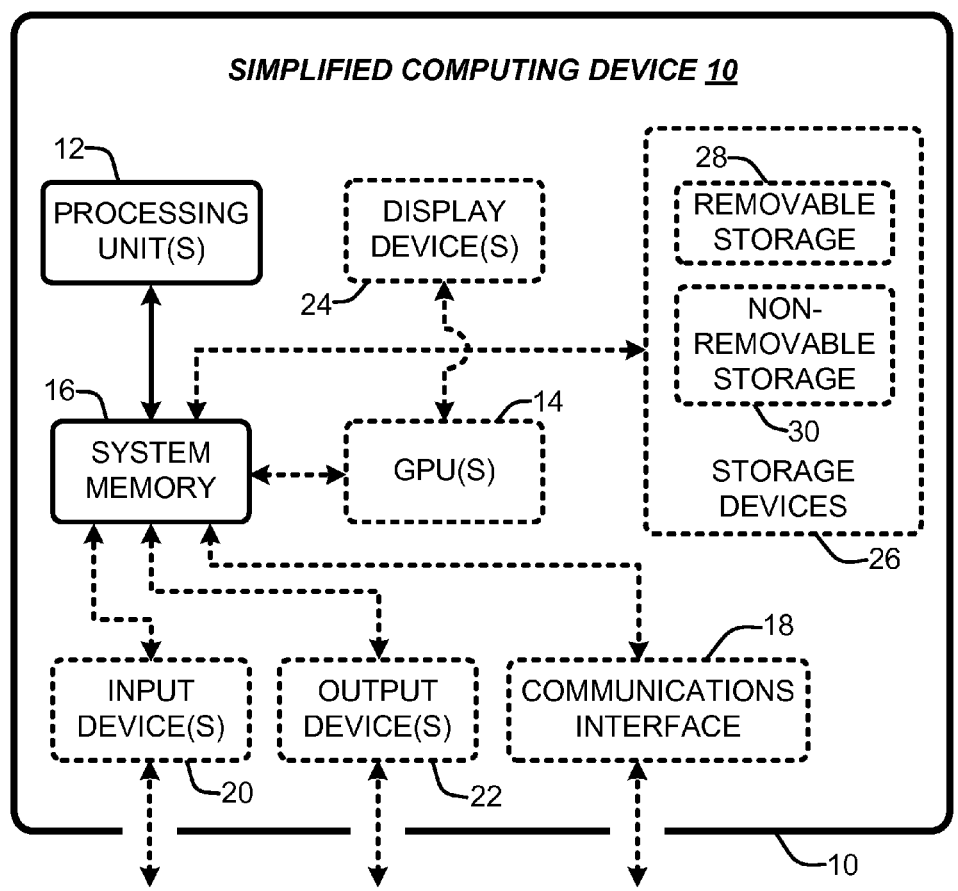
FIG. 4 is a diagram illustrating a simplified example of a general-purpose computer system on which various implementations and elements of the input recommendation technique, as described herein, may be realized.

The input recommendation technique implementations described herein are operational within numerous types of general purpose or special purpose computing system environments or configurations. FIG. 4 illustrates a simplified example of a general-purpose computer system on which various implementations and elements of the input recommendation technique, as described herein, may be implemented. It is noted that any boxes that are represented by broken or dashed lines in the simplified computing device 10 shown in FIG. 4 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the input recommendation technique implementations described herein, the device should have a sufficient computational capability and system memory to enable basic computational operations. In particular, the computational capability of the simplified computing device 10 shown in FIG. 4 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the input recommendation technique implementations described herein, including input, output, control, feedback, and response to one or more users or other devices or systems associated with the input recommendation technique implementations, are enabled by a variety of Natural User Interface (NUI) scenarios. The NUI techniques and scenarios enabled by the input recommendation technique implementations include, but are not limited to, interface technologies that allow one or more users user to interact with the input recommendation technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the input recommendation technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the input recommendation technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 4 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various input recommendation technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The input recommendation technique implementations described herein may be further described in the general context of computer-executable instructions, such as program modules, being executed by a computing device. Generally, program modules include routines, programs, objects, components, data structures, and the like, that perform particular tasks or implement particular abstract data types. The input recommendation technique implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

5.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a system is employed for recommending a primary user input mechanism to an application that executes on a computing device. The system includes the computing device and a plurality of different user input mechanisms one or more of which are utilized by users of the computing device to input information into the computing device. The system also includes a computer program having program modules executable by the computing device. The computing device is directed by the program modules of the computer program to monitor the utilization of each of the user input mechanisms on an ongoing basis, where this monitoring includes weighting each of the user input mechanisms based on its frequency of use, and upon receiving an indication to launch the application on the computing device, recommend to the application that a one of the user input mechanisms currently having the highest weight be the primary user input mechanism.

In one implementation of the just-described system the computing device includes one of: a smartphone; or a tablet computer; or a laptop computer; or a desktop computer; or a video game console; or a wearable computer; or a surface computer; or a user input console employed in a smart home; or a user input console employed in a motor vehicle. In another implementation the user input mechanisms include a physical keyboard that is either integrated into the computing device, or externally connected thereto. In another implementation the user input mechanisms include one or more of: a mouse that is externally connected to the computing device; or a handheld remote controller that is externally connected to the computing device. In another implementation the user input mechanisms include a trackpad that is either integrated into the computing device, or externally connected thereto.

In another implementation the computing device is touch-enabled, and the user input mechanisms include one or more of: finger-based screen-contacting gestures that are made by the users of the computing device; or stylus-based screen-contacting gestures that are made by the users of the computing device. In another implementation the computing device is voice-enabled, and the user input mechanisms include speech that the users of the computing device utter. In another implementation the computing device is vision-enabled, and the user input mechanisms include one or more of, gaze-based gestures that are made by the users of the computing device, or hand-based in-air gestures that are made by these users. In another implementation the computing device is motion-enabled, and the user input mechanisms include movements of the computing device that are made by the users of the computing device.

The implementations described in any of the previous paragraphs in this section may also be combined with each other, and with one or more of the implementations and versions described prior to this section. For example, some or all of the preceding implementations and versions may be combined with the foregoing implementation where the computing device is further directed by the program modules of the computer program to recommend to the application that another one of the user input mechanisms currently having the second highest weight be a secondary user input mechanism. In addition, some or all of the preceding implementations and versions may be combined with the foregoing implementation where the program module for recommending to the application that a one of the user input mechanisms currently having the highest weight be the primary user input mechanism includes program modules for: determining the current environment of the computing device; and recommending to the application that a one of the user input mechanisms currently having the highest weight for this current environment be the primary user input mechanism. In addition, some or all of the preceding implementations and versions may be combined with the foregoing implementation where the computing device is further directed by the program modules of the computer program to, whenever the application is still running and the weighting changes such that a different one of the user input mechanisms currently has the highest weight, recommend to the application that the primary user input mechanism be changed to this different one of the user input mechanisms.

In addition, some or all of the preceding implementations and versions may be combined with the foregoing implementation where either, the action of monitoring the utilization of each of the user input mechanisms on an ongoing basis is performed separately for each of the users of the computing device so that the weighting is user-specific, or the action of monitoring the utilization of each of the user input mechanisms on an ongoing basis is aggregated across the users of the computing device so that the weighting is user-independent. In addition, some or all of the preceding implementations and versions may be combined with the foregoing implementation where either, the action of monitoring the utilization of each of the user input mechanisms on an ongoing basis is performed on a per-application basis so that the weighting is application-specific, or the action of monitoring the utilization of each of the user input mechanisms on an ongoing basis is aggregated across each different application that executes on the computing device so that the weighting is application-independent.

In addition, some or all of the preceding implementations and versions may be combined with the foregoing implementation where the application includes a web browser, and the action of monitoring the utilization of each of the user input mechanisms on an ongoing basis is performed separately for each different website that is accessed by the web browser so that the weighting is website-specific. In addition, some or all of the preceding implementations and versions may be combined with the foregoing implementation where the application includes a web browser that includes a plurality of tabbed frames that are utilized by the users of the computing device to browse the web, and the action of monitoring the utilization of each of the user input mechanisms on an ongoing basis is performed separately for each different tabbed frame so that the weighting is frame-specific. In addition, some or all of the preceding implementations and versions may be combined with the foregoing implementation where the computing device is further directed by the program modules of the computer program to regularly store the current weighting after a prescribed interval of time has elapsed.

In another implementation, a system is employed for providing user input mechanism utilization metrics to an application that executes on a computing device. The system includes the computing device and a plurality of different user input mechanisms one or more of which are utilized by users of the computing device to input information into the computing device. The system also includes a computer program having program modules executable by the computing device. The computing device is directed by the program modules of the computer program to monitor the utilization of each of the user input mechanisms on an ongoing basis, where this monitoring includes weighting each of the user input mechanisms based on its frequency of use, and upon receiving an indication to launch the application on the computing device, provide this weighting to the application.

In one implementation of the just-described system the computing device is further directed by the program modules of the computer program to, whenever the application is still running and the weighting changes, provide the current weighting to the application.

In another implementation, a computer-implemented process is employed for recommending a primary user input mechanism to an application that executes on a computing device which includes a plurality of different user input mechanisms one or more of which are utilized by users of the computing device to input information into the computing device. This process uses the computing device to perform the following process actions. More particularly, the process involves monitoring the utilization of each of the user input mechanisms on an ongoing basis, where this monitoring includes weighting each of the user input mechanisms based on its frequency of use, and upon receiving an indication to launch the application, recommending to the application that a one of the user input mechanisms currently having the highest weight be the primary user input mechanism.

In another implementation, a user input mechanism recommendation system is implemented by a means for recommending a primary user input mechanism to an application that executes on a computing device. The user input mechanism recommendation system includes a plurality of different user input mechanism means for inputting information into the computing device, one or more of which are utilized by users of the computing device to input information into the computing device. The user input mechanism recommendation system also includes the computing device which includes a processor configured to execute a monitoring step for monitoring the utilization of each of the user input mechanisms on an ongoing basis, where this monitoring includes weighting each of the user input mechanisms based on its frequency of use, and a recommendation step for recommending to the application that a one of the user input mechanisms currently having the highest weight be the primary user input mechanism when an indication to launch the application on the computing device is received.

Some or all of the preceding implementations and versions of the user input mechanism recommendation system may be combined with an implementation where the processor is further configured to execute another recommendation step for recommending to the application that another one of the user input mechanisms currently having the second highest weight be a secondary user input mechanism. Some or all of the preceding implementations and versions of the user input mechanism recommendation system may also be combined with an implementation where the recommendation step for recommending to the application that a one of the user input mechanisms currently having the highest weight be the primary user input mechanism includes a determination step for determining the current environment of the computing device; and another recommendation step for recommending to the application that a one of the user input mechanisms currently having the highest weight for this current environment be the primary user input mechanism. Some or all of the preceding implementations and versions of the user input mechanism recommendation system may also be combined with an implementation where, whenever the application is still running and the weighting changes such that a different one of the user input mechanisms currently has the highest weight, the processor is further configured to execute another recommendation step for recommending to the application that the primary user input mechanism be changed to this different one of the user input mechanisms.

Some or all of the preceding implementations and versions of the user input mechanism recommendation system may also be combined with an implementation where either, the monitoring step for monitoring the utilization of each of the user input mechanisms on an ongoing basis is performed separately for each of the users of the computing device so that the weighting is user-specific, or this monitoring step is aggregated across the users of the computing device so that the weighting is user-independent. Some or all of the preceding implementations and versions of the user input mechanism recommendation system may also be combined with an implementation where either, the monitoring step for monitoring the utilization of each of the user input mechanisms on an ongoing basis is performed on a per-application basis so that the weighting is application-specific, or this monitoring step is aggregated across each different application that executes on the computing device so that the weighting is application-independent. Some or all of the preceding implementations and versions of the user input mechanism recommendation system may also be combined with an implementation where the application includes a web browser, and the monitoring step for monitoring the utilization of each of the user input mechanisms on an ongoing basis is performed separately for each different website that is accessed by the web browser so that the weighting is website-specific. Some or all of the preceding implementations and versions of the user input mechanism recommendation system may also be combined with an implementation where the application includes a web browser that includes a plurality of tabbed frames that are utilized by the users of the computing device to browse the web, and the monitoring step for monitoring the utilization of each of the user input mechanisms on an ongoing basis is performed separately for each different tabbed frame so that the weighting is frame-specific.

In addition, some or all of the preceding implementations and versions of the user input mechanism recommendation system may also be combined with an implementation where the processor is further configured to execute a storing step for regularly storing the current weighting after a prescribed interval of time has elapsed.

In another implementation, a user input mechanism utilization metrics system is implemented by a means for providing user input mechanism utilization metrics to an application that executes on a computing device. The user input mechanism utilization metrics system includes a plurality of different user input mechanism means for inputting information into the computing device, one or more of which are utilized by users of the computing device to input information into the computing device. The user input mechanism recommendation system also includes the computing device which includes a processor configured to execute a monitoring step for monitoring the utilization of each of the user input mechanisms on an ongoing basis, where this monitoring includes weighting each of the user input mechanisms based on its frequency of use, and a weighting provisioning step for providing this weighting to the application when an indication to launch the application on the computing device is received.

In one implementation of the just-described user input mechanism utilization metrics system the processor is further configured to execute another weighting provisioning step for providing the current weighting to the application whenever the application is still running and the weighting changes.

In various implementations, a user input mechanism recommendation process is implemented by a step for recommending a primary user input mechanism to an application that executes on a computing device that includes a plurality of different user input mechanisms one or more of which are utilized by users of the computing device to input information into the computing device. For example, in one implementation the user input mechanism recommendation process includes a step for monitoring the utilization of each of the user input mechanisms on an ongoing basis, where this monitoring includes weighting each of the user input mechanisms based on its frequency of use, and a step for recommending to the application that a one of the user input mechanisms currently having the highest weight be the primary user input mechanism when an indication to launch the application is received.

Wherefore, what is claimed is:

1. A system for recommending a user input mechanism to an application that executes on a computing device, comprising:
   the computing device;
   a plurality of different physical input mechanisms one or more of which are utilized by users of the computing device to input information into the computing device; and
   a computer program having program modules executable by the computing device, the computing device being directed by the program modules of the computer program to,
      monitor the utilization of each of the physical input mechanisms on an ongoing basis, said monitoring comprising weighting each of the physical input mechanisms based on its frequency of use, and
      upon receiving an indication to launch the application on the computing device, recommend to the application that a one of the physical input mechanisms currently having the highest weight be a primary user input mechanism.

2. The system of claim 1, wherein the computing device comprises one of:
   a smartphone; or
   a tablet computer; or
   a laptop computer; or
   a desktop computer; or
   a video game console; or
   a wearable computer; or
   a surface computer; or
   a user input console employed in a smart home; or
   a user input console employed in a motor vehicle.

3. The system of claim 1, wherein the physical input mechanisms comprise a physical keyboard that is either integrated into the computing device, or externally connected thereto.

4. The system of claim 1, wherein the physical input mechanisms comprise one or more of:
   a mouse that is externally connected to the computing device; or
   a handheld remote controller that is externally connected to the computing device.

5. The system of claim 1, wherein the physical input mechanisms comprise a trackpad that is either integrated into the computing device, or externally connected thereto.

6. The system of claim 1, wherein the computing device is touch-enabled, and the physical input mechanisms comprise one or more of:
   finger-based screen-contacting gestures that are made by the users of the computing device; or
   stylus-based screen-contacting gestures that are made by the users of the computing device.

7. The system of claim 1, wherein,
   the computing device is voice-enabled, and
   the physical input mechanisms comprise speech that the users of the computing device utter.

8. The system of claim 1, wherein,
   the computing device is vision-enabled, and
   the physical input mechanisms comprise one or more of,
      gaze-based gestures that are made by the users of the computing device, or
      hand-based in-air gestures that are made by said users.

9. The system of claim 1, wherein,
the computing device is motion-enabled, and
the physical input mechanisms comprise movements of the computing device that are made by the users of the computing device.

10. The system of claim 1, wherein the computing device is further directed by the program modules of the computer program to recommend to the application that another one of the physical input mechanisms currently having the second highest weight be a secondary user input mechanism.

11. The system of claim 1, wherein the program module for recommending to the application that a one of the physical input mechanisms currently having the highest weight be a primary user input mechanism comprises program modules for:
determining the current environment of the computing device; and
recommending to the application that a one of the physical input mechanisms currently having the highest weight for said current environment be the primary user input mechanism.

12. The system of claim 1, wherein the computing device is further directed by the program modules of the computer program to, whenever the application is still running and said weighting changes such that a different one of the physical input mechanisms currently has the highest weight, recommend to the application that the primary user input mechanism be changed to said different one of the physical input mechanisms.

13. The system of claim 1, wherein either,
the action of monitoring the utilization of each of the physical input mechanisms on an ongoing basis is performed separately for each of the users of the computing device so that said weighting is user-specific, or
the action of monitoring the utilization of each of the physical input mechanisms on an ongoing basis is aggregated across the users of the computing device so that said weighting is user-independent.

14. The system of claim 1, wherein either,
the action of monitoring the utilization of each of the physical input mechanisms on an ongoing basis is performed on a per-application basis so that said weighting is application-specific, or
the action of monitoring the utilization of each of the physical input mechanisms on an ongoing basis is aggregated across each different application that executes on the computing device so that said weighting is application-independent.

15. The system of claim 1, wherein the application comprises a web browser, and the action of monitoring the utilization of each of the physical input mechanisms on an ongoing basis is performed separately for each different website that is accessed by the web browser so that said weighting is website-specific.

16. The system of claim 1, wherein the application comprises a web browser comprising a plurality of tabbed frames that are utilized by the users of the computing device to browse the web, and the action of monitoring the utilization of each of the physical input mechanisms on an ongoing basis is performed separately for each different tabbed frame so that said weighting is frame-specific.

17. The system of claim 1, wherein the computing device is further directed by the program modules of the computer program to regularly store the current weighting after a prescribed interval of time has elapsed.

18. A system for providing user input mechanism utilization metrics to an application that executes on a computing device, comprising:
the computing device;
a plurality of different physical input mechanisms one or more of which are utilized by users of the computing device to input information into the computing device; and
a computer program having program modules executable by the computing device, the computing device being directed by the program modules of the computer program to,
monitor the utilization of each of the physical input mechanisms on an ongoing basis, said monitoring comprising weighting each of the physical input mechanisms based on its frequency of use, and
upon receiving an indication to launch the application on the computing device, provide said weighting to the application.

19. The system of claim 18, wherein the computing device is further directed by the program modules of the computer program to, whenever the application is still running and said weighting changes, provide the current weighting to the application.

20. A computer-implemented process for recommending a user input mechanism to an application that executes on a computing device comprising a plurality of different physical input mechanisms one or more of which are utilized by users of the computing device to input information into the computing device, comprising the actions of:
using the computing device to perform the following process actions:
monitoring the utilization of each of the physical input mechanisms on an ongoing basis, said monitoring comprising weighting each of the physical input mechanisms based on its frequency of use, and
upon receiving an indication to launch the application, recommending to the application that a one of the physical input mechanisms currently having the highest weight be a primary user input mechanism.

* * * * *